US010052825B2

(12) United States Patent
Tjellesen et al.

(10) Patent No.: US 10,052,825 B2
(45) Date of Patent: Aug. 21, 2018

(54) THREE-DIMENSIONAL PRINTER WITH COOLED PROTECTIVE SHEET SEPARATOR

(71) Applicant: Hewlett-Packard Development Company, L.P., Houston, TX (US)

(72) Inventors: Frederik Walsted Tjellesen, Copenhagen N (DK); Anders Ørnsholt Hartmann, Copenhagen N (DK)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/890,861

(22) PCT Filed: May 9, 2014

(86) PCT No.: PCT/EP2014/059586
§ 371 (c)(1),
(2) Date: Nov. 12, 2015

(87) PCT Pub. No.: WO2014/184117
PCT Pub. Date: Nov. 20, 2014

(65) Prior Publication Data
US 2016/0082669 A1    Mar. 24, 2016

(30) Foreign Application Priority Data

May 13, 2013  (GB) .................................. 1308565.9

(51) Int. Cl.
*B29C 67/00*  (2017.01)
*B29C 35/16*  (2006.01)
(Continued)

(52) U.S. Cl.
CPC .......... *B29C 67/0088* (2013.01); *B29C 35/16* (2013.01); *B29C 64/153* (2017.08);
(Continued)

(58) Field of Classification Search
CPC . B29C 67/0074; B29C 67/0088; B29C 64/20; B29C 64/295; B29C 64/30
See application file for complete search history.

(56) References Cited

U.S. PATENT DOCUMENTS

2002/0149137 A1   10/2002   Jang et al.
2005/0208168 A1   9/2005    Hickerson et al.
2012/0201960 A1*  8/2012    Hartmann ........... B29C 67/0077
                                                427/256

* cited by examiner

*Primary Examiner* — Timothy Kennedy
(74) *Attorney, Agent, or Firm* — HP Inc. Patent Department

(57) ABSTRACT

A three-dimensional printer (100) having a means for cooling (124) the uppermost surface of a material bed in a region immediately before a deposited layer of material (e.g. powder) at the uppermost surface is separated from a protective sheet (116). The protective sheet (116) provides a physical barrier between the deposited layer of material and a thermal print head (114) during printing. The separation of the protective sheet from the material bed may occur to create a distribution gap for a new layer of powder to be deposited (118). The cooling means may facilitate separation of the protective sheet from the deposited layer, and especially from the portion of that layer that has been heat-treated in the preceding printing pass. The cooling means may be an actively cooled surface on a separator that formed part of the print head.

20 Claims, 2 Drawing Sheets

(51) Int. Cl.
B29C 64/153 (2017.01)
B29C 64/20 (2017.01)
B29C 64/386 (2017.01)
B33Y 30/00 (2015.01)
B29K 105/00 (2006.01)

(52) U.S. Cl.
CPC ............ B29C 64/20 (2017.08); B29C 64/386 (2017.08); B29K 2105/251 (2013.01); B33Y 30/00 (2014.12)

THREE-DIMENSIONAL PRINTER WITH COOLED PROTECTIVE SHEET SEPARATOR

CROSS-REFERENCE TO RELATED PATENT APPLICATIONS

This application is a U.S. National Phase Application under 35 U.S.C. § 371 of International Patent Application No. PCT/EP2014/059586, filed May 9, 2014, and claims the priority of United Kingdom Patent Application 1308565.9, filed May 13, 2013, which are incorporated by reference as if expressly set forth in their respective entireties herein.

FIELD OF THE INVENTION

The invention relates to a three-dimensional printer, e.g. suitable for use as rapid prototyping apparatus, in which a three-dimensional model is built by successive deposition of a plurality of layers.

BACKGROUND TO THE INVENTION

There are many different technologies currently used to build physical three-dimensional models using additive manufacturing technology, e.g. building a model layer by layer. Typically, a virtual design of the three-dimensional model, e.g. represented through computer-aided design (CAD) software or the like, is transformed into a plurality of thin (quasi-two-dimensional) cross-sectional layers which are built on one another in succession.

There are a number of known ways in which the cross-sectional layers may be formed. For example, it is known to sinter a selected sub-region of a deposited area of green material, e.g. by guiding a laser beam over the sub-region. Such an arrangement is disclosed in WO 2004/056512. Another example involves the use of a two-dimensional heat or light source arranged to melt or cure all of a selected sub-region at the same time by masking out the areas not to be melted. Such an arrangement is disclosed in US 2002/0149137.

Other techniques may involve extruding or otherwise depositing green material already in the correct shape of the cross-sectional layer (e.g. by reference to an x-y-z-table constructed from the virtual design data). The deposited material may then harden naturally or be cured (e.g. by a powerful light source) to form the desired cross-sectional layer.

In a yet further example, each desired cross-sectional layer may be cut out of a sheet material, wherein the model is built by gluing together the cut-out layers.

US 2005/208168 discloses a technique in which a desired cross section is formed on the surface of a heated drum and subsequently transferred from the drum onto and fused together with previously deposited layers.

WO 2011/045291 discloses the use of a thermal head as a means of selectively heat-treating successive layers of green material to create a plurality of cross-sectional layers forming a three-dimensional model.

During heat-treatment in this arrangement, there is relative movement between the deposited layer and the heating elements on the thermal head. To prevent the heat-treated material from adhering to the heating elements, which would disrupt the building process and eventually cause overheating and failure of the thermal head, WO 2011/045291 discloses the use of a protective sheet beneath the thermal head, i.e. disposed between the heating elements and the deposited layer.

WO 2011/045291 also discloses the provision of independently heatable covers (e.g. plates) in thermal communication with the surface of the material bed on either side of the print mechanism to control the temperature of the heat-treated material in a manner to prevent warping of the model.

SUMMARY OF THE INVENTION

The present invention further enhances the mechanism disclosed in WO 2011/045291, in particular in the way in which the protective sheet is separated from an uppermost surface of the material bed to permit a new layer of green material to be deposited prior to heat treatment.

At its most general, the present invention provides a means for cooling the uppermost surface of the material bed in a region immediately before it is separated from the protective sheet. The separation of protective sheet from material bed at this point may be to create a distribution gap for a new layer of green material, e.g. a spread layer of powdered build material. The cooling means may facilitate separation of the protective sheet from the uppermost layer, and especially from the portion of that layer that has been heat-treated in the preceding printing pass.

The cooling means may be particularly beneficial where a temperature regulating element (e.g. heat plate) maintains the temperature of the material bed after a preceding printing step. As explained above, having a temperature regulating element for this purpose can reduce thermal shrinkage of heat-treated build material, which can cause warping or distortion of the model. However, heat-treated material (sometimes referred to as printed material herein) whose temperature is maintained at a relatively high level in this way may possess a tackiness and/or flexibility whereby it tends to move with the protective sheet when the protective sheet is drawn away from the material bed. This tendency may also cause warping of the model. The invention seeks to provide a balance between these conflicting factors. A benefit of the invention may be that the printing may be used with a wider range of build materials.

The cooling function of the invention may thus be used to secure the printed material (e.g. consisting of a molten, but supercooled polymer), so that the protective sheet (e.g. a teflonised weave) can be peeled away from it. If there is any adhesion (full of temporary) between the two, which can occur especially for the first printed layer on the material bed, the printed material may deform and eventually follow the protective sheet as it is drawn away. If there is only a moderate adhesion, e.g. causing small areas or sections of the layer to be displaced a little in the material bed, the resulting printed parts may be distorted, e.g. causing a mechanical "lean" of fabricated parts.

Thus, according to the invention there is provided a three-dimensional printer for building a three-dimensional object by sequential deposition and heat treatment of a plurality of cross-sectional layers, the printer comprising: a material bed for supporting the plurality of cross-sectional layers; a print mechanism movably mounted in a print direction over the material bed, the print mechanism comprising: a temperature regulating element in thermal communication with the material bed to control the temperature of an uppermost layer of deposited material; a recoater for spreading a layer of flowable green material on the material bed, the recoater being located after the temperature regulating element in the print direction; and a print head arranged to transfer thermal energy by conduction to the layer of flowable green material on the material bed, the print head being located after the recoater in the print direction; a protective sheet located over the material bed in between the uppermost layer of material on the material bed and the temperature regulating element and in between the layer of flowable green material and the print head, wherein the print mechanism includes a separator located before the recoater in the print direction, the separator being arranged to separate the protective cover from the uppermost layer of deposited material to provide access for the recoater to spread the layer of flowable green material on to the uppermost layer of material on the material bed, and wherein the separator has a cooling surface in thermal communication with the uppermost layer of deposited material, the cooling surface being at a lower temperature than the temperature of the temperature regulating element.

In operation, the print mechanism is moved in the print direction across the material bed. The temperature regulating element may begin the printing movement in a position where it fully covers the material bed, whereby it maintains the temperature of the uppermost layer, i.e. the printed layer of the preceding printing step. The protective sheet lies between the temperature regulating element and material bed. The print mechanism preferably moves relative to the protective sheet.

As the printing operation proceeds, the recoater is drawn over the material bed. Just before it reaches the material bed, the recoater may receive a heap of the flowable green material to spread over the uppermost layer on the material bed. In order to spread the material, the protective sheet must be drawn away from the uppermost layer on the material bed to create a distribution gap. The separator may act to perform this function by guiding the protective sheet away from the path of the recoater. The separator may include means for deflecting the protective sheet, e.g. at an angle to the uppermost surface of the material bed. The angle may be oblique. For example, the means for deflecting the protective sheet may be a roller mounted above the cooling surface of the separator before (in the print direction) a back edge of the cooling surface. Separation may thus take place at the back edge of the cooling surface as the protective sheet is guided up and away from it as the print mechanism moves in the print direction. The function of the cooling surface is to drawn heat away from the uppermost surface of the material bed just before the protective sheet is separated from it. As mentioned above, this facilitates separation, especially where the uppermost surface includes printed material from the previous printing pass.

After the protective sheet has been drawn away from the material bed, there is a distribution gap in which the recoater may spread a layer of flowable green material for the next printing operation. The protective sheet may be brought into contact with the new layer of material as soon as it is spread. The distribution gap may be the only location at which the material bed is exposed from the protective sheet.

The cooling surface may be in thermal communication with a heat sink to maintain its temperature. For example, the printer may include a coolant distribution circuit arranged to deliver a supply of coolant to the separator. The cooling surface may be provided on a thermally conductive material block (e.g. made of copper) in contact with the protective sheet. The block may be in thermal contact with the coolant distribution circuit or may be part of it. The coolant may be water or any other suitable heat transfer medium. Other cooling mechanisms may be used for the cooling surface, e.g. a thermoelectric cooling element or an array of heat transfer pipes.

The temperature of the cooling surface is selected to impart a cooling profile whereby the temperature of the uppermost surface of deposited material decreases by 5° C. or more. Herein, "cooling profile" may mean the evolution of surface temperature with time at any given point on the uppermost surface of the material bed. The intention of the invention may be to ensure that the surface temperature is a minimum at the point where the protective sheet is separated from it. The cooling profile may cause the surface temperature to drop below the temperature of the temperature regulating element. Preferably the minimum surface temperature caused by the cooling profile is greater than the crystallization temperature of the polymer material. Factors which may influence the cooling profile are the width of the cooling surface (i.e. its dimension in the print direction), the temperature of the cooling surface, and the speed of the print mechanism as it is drawn over the material bed. These factors may be selected to produce a desired minimum temperature of the cooling profile. Preferably the minimum temperature is maintained as high as possible to maximise the effectiveness of the separator whilst preventing warping of the model due to thermal shrinkage.

In one embodiment, the temperature of the temperature regulating element may be 90° C. or more, e.g. in the range 90° C. to 105° C. The temperature of the cooling surface may be 70° C. or less, preferably less than 60° C., more preferably less than 50° C., e.g. in the range 45° C. to 50° C.

Herein "flowable" may include powdered material, liquids and extrudable material, e.g. pastes or the like. Powdered material may be preferred. In one embodiment, the flowable green material may consist of a powdered polymer material having a crystallization temperature and a melting point, and wherein the temperature regulating element has a temperature above the crystallization temperature and below the melting point. Ideally, the cooling element should only cool sufficient to secure non-stick properties, but should not cool the polymer to a temperature where it would crystallise. For good sintering (with low porosity) it may be desirable to keep the printed parts above the crystallization temperature for as long as possible, to allow flowing together the molten particles.

The recoater may be any means for laying out a layer of flowable (e.g. formable) material having substantially uniform thickness. For example, if the material is flowable powder, the recoater may include a spreading element (e.g. angled blade) for substantially evenly distributing the green material over the bed.

The print mechanism includes a compressor or compacting element for compacting the layer of flowable green material, the compressor being located before the print head in the print direction. The compressor may be any of a roller, stamping member or tapering wedge. Compressing the green material may promote efficient transformation, e.g. by improving the bulk thermal conductivity of the cross-sectional layer, and may provide better mechanical stability for supporting for the model under construction. Preferably, the compressor includes a tapering wedge element which is arranged to travel over the material bed. The wedge element may have a sloping surface, which is arranged to gradually reduce the clearance between the material bed and compressor in the direction of travel of the wedge element.

The compressor may be arranged to receive the protective sheet and guide it into contact with the layer of flowable green material. In other words, the protective sheet may be brought into contact with the new layer of green material immediately after it is spread by the recoater, i.e. simultaneously with the compacting process.

The compressor may include a heating element arranged to heat the layer of flowable green material as it is compacted. The compressor may thus pre-heat the green material before it reaches the print head. Pre-heating the green material may act to bring it closer to the temperature at which it transforms into a fixed state. The amount of heating then required by the thermal head to effect transformation may thus be reduced, which may speed up the overall process. Moreover, since the heat from the advance heater may be conducted to the heat-treated material in the previous layers, the temperature of the material bed as a whole may be maintained, which can reduce or minimise the thermal tensions experienced by the treated material, thereby reducing warping of the model under construction. In one embodiment, the compressor may be arranged to bring the deposited layer to a temperature that is slightly, e.g. 5-10° C., below the transformation temperature (e.g. melting point) of the green material.

The temperature of the compressor may be greater than the temperature of the temperature regulating element. The temperature regulating element may comprise a plate-like cover dimensioned to lie over the material bed. It may incorporate inductive or resistive heaters to maintain its temperature.

To avoid sticking to the deposited material, the protective sheet is preferably made from a material exhibiting good non-stick properties, e.g. PTFE (e.g. glass fibre reinforced PTFE), pure silicone, silicone impregnated paper, polyimide or the like. Since the protective sheet is to transfer heat from both the thermal head and the advance heater, a thin layer of material may be used to facilitate heat transfer by conduction. Preferably the protective sheet is made from a material with good thermal conductivity. Glass fibre reinforced PTFE having a thickness of 0.08 mm may be preferred.

In one embodiment, the protective sheet may be disposable. For example, the protective sheet may be supplied from a roll at one end of the apparatus. The sheet may renew itself by moving with respect to the material bed, e.g. gradually by moving a small amount (e.g. 1-2 mm) for each pass of the thermal head, or completely renewing for every pass of the thermal head.

The print mechanism may include a post-print temperature regulating element located after the print head in the print direction, the post-print temperature regulating element being located on the protective sheet and in thermal communication with the material bed to control the temperature of an uppermost layer of deposited material after heat treatment of a selectable region thereof. The post-print temperature regulating element may thus perform the equivalent function to the temperature regulating element discussed above for the material bed after the print mechanism has completed its pass. It may have the same physical properties as the temperature regulating element. In particular, the post-print temperature regulating element may be at the same temperature as the temperature regulating element located before the recoater in the print direction.

The print mechanism may further include a post-print separator located after the print head and before the post-print temperature regulating element in the print direction, the post-print separator being arranged to separate the protective cover from the uppermost layer of deposited material, wherein the post-print separator has a cooling surface in thermal communication with the uppermost layer of deposited material, the cooling surface being at a lower temperature than the temperature of the post-print temperature regulating element.

The cooling surface of the post-print separator may be at a lower temperature than the cooling surface of the separator, since it may be required to cooling material that have just been heat treated, whereas separator is required to cool material that has been under the temperature regulating element.

In one embodiment, the print mechanism may be reversible, i.e. capable of performing material deposition and printing in two opposite directions across the material bed. This arrangement may be desirable because the overall printing operation may be faster, and because bi-directional printing may facilitate maintaining a consistent temperature profile across the material bed.

In a print mechanism capable of operating to print in a reverse direction opposite to the print direction reversible print mechanism: the recoater may be interchangeable with a reverse post-print separator; the post-print separator may be interchangeable with a reverse recoater; and the print mechanism includes a reverse separator located before the post-print temperature regulating element in the print direction.

There may thus be a recoater and post-print separator on both sides of the print head. Each recoater and post-print separator pairing may be mounted on a reciprocating mechanism which automatically interchanges their position over the material bed depending on the print direction.

The separator and reverse separator may be connected to a common coolant distribution circuit. The post-print separator and reverse post-print separator may also be connected to the common coolant distribution circuit.

Herein "green material" means any material capable of flowing or being extruded into a layer that can subsequently be selectively solidified through heat treatment. For example, the green material may be a flowable medium, such as powder or the like, or an extrudable medium, such as unsintered ceramic, paste or the like. Solidification through heat treatment is arranged to fixed the shape of the heat-treated region, e.g. through any one of melting, sintering, curing or hardening. Herein "curing" may refer to any one or more of chemical hardening, thermal hardening and vaporization hardening. The term "heat-treating" may thus refer to any one or more of melting, sintering, curing or hardening. In addition to transforming (e.g. solidifying) the green material, the heat-treatment may act to bond the heat-treated area of one layer to any heat-treated material that it contacts in the layer below. In this way, the printing operation may ensure the structural integrity of the three-dimensional model when the untreated green material is removed.

In this disclosure, the term "print head" may be used generically to mean a device having a plurality of selectively activatable heating elements that are arranged to emit heat energy therefrom. The print head may have a heat emitting region, e.g. edge or surface, arranged to contact an area, e.g. by sweeping across it. A selectable sub-region of the area may be heated by suitable activating and deactivating the heating elements as the heat emitting region is swept over the area. Some examples of suitable print heads are known in the field of thermal printers, where a printed image can be formed by selectively heating thermochromic paper. The print head may be a conventional "corner edge", "true edge" or "near edge" type used for printing on flat media. The print head may incorporate or be in thermal communication with a cooling element, e.g. to improve the printing resolution by improving the temperature differential between activated and non-activated heating elements on the print head. The print head cooling element may be connected to the common coolant distribution circuit.

The material bed may be lowered by a predetermined distance following each pass of the print mechanism, as is conventional.

To move the print mechanism, the printer may include a DC motor such as a stepper motor, servo motor or the like. The print direction may extend at an angle orthogonal to the print head, whereby the print head sweeps out an area on the material bed during each printing pass. The material bed may be oblong in plan view, e.g. with an oblong base having upstanding side walls, which may have varying height. Each deposited layer may be an oblong plate-like element.

BRIEF DESCRIPTION OF THE DRAWINGS

An embodiment of the invention is discussed below with reference to the accompanying drawings, in which.

DETAILED DESCRIPTION; FURTHER OPTIONS AND PREFERENCES

Figure 1:
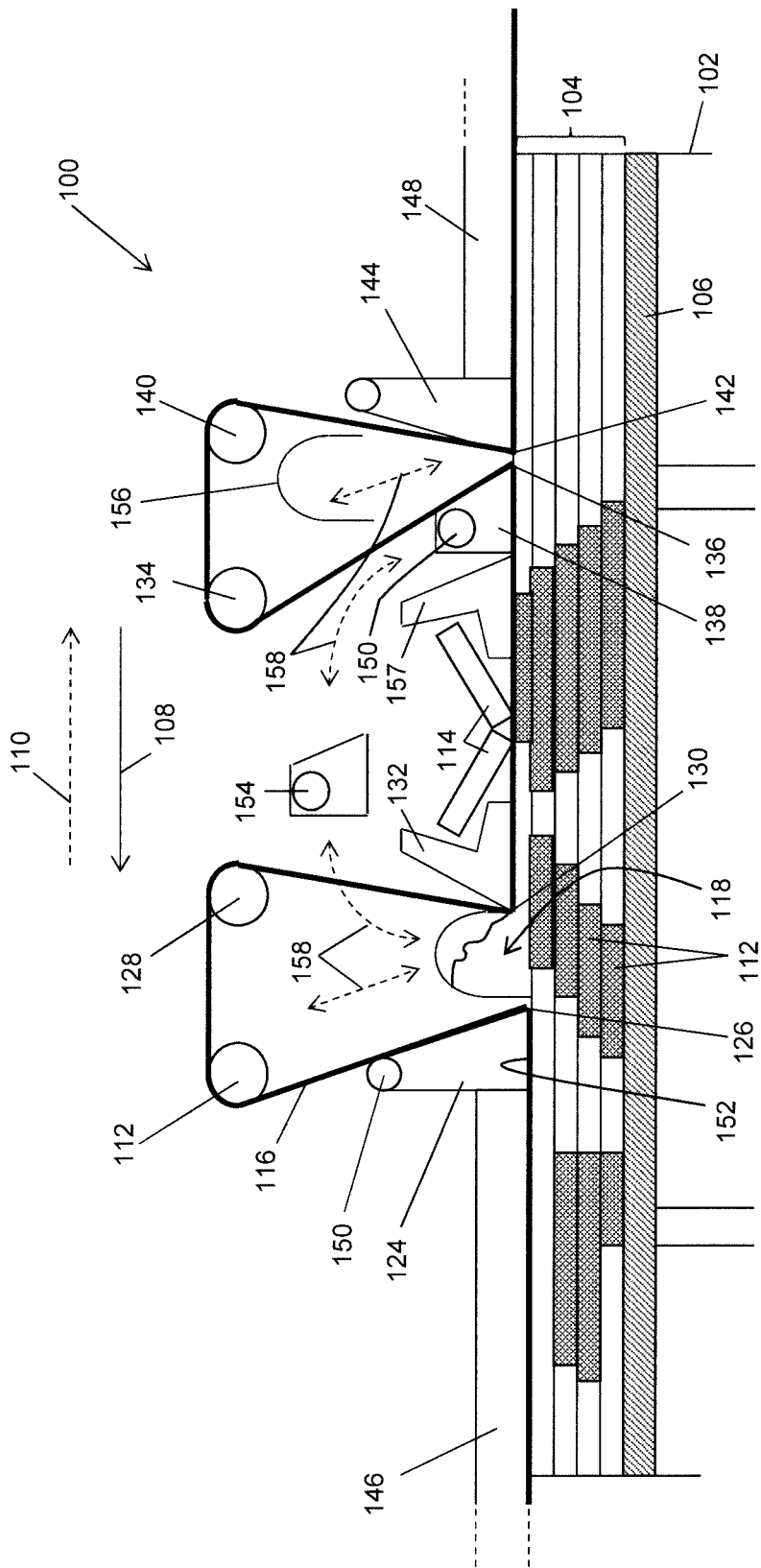
FIG. 1 shows a cross-sectional view through a print mechanism for a three-dimensional printer that is an embodiment of the invention.

FIG. 1 shows a cross-section view through a print mechanism 100 for a three-dimensional printer that is an embodiment of the invention. The print mechanism 100 is movably mounted over a material bed 102 which supports a plurality of layers of deposited build material 104 on a platform 106. The print mechanism 100 may be moved across the top surface of the material bed in a print direction 108 (and a reverse print direction 110) by a stepper motor (not shown) or the like. The platform 106 of the material bed may be lowered in a step-wise fashion to leave space for each successive layer.

Each of the plurality of deposited layer 104 may have one or more heat-treated portions 112, e.g. areas where the build material has been transformed, e.g. melted, sintered or otherwise solidified to bind together. Heat-transformed portions 112 in adjacent layers bind with each other to form a three-dimensional model consists of a plurality of cross-sectional layers.

In this embodiment, the heat-treatment is performed by a pair of thermal print heads 114, each of which have an array of selectively activatable heating elements, e.g. heating resistors or the like. For example, the thermal print head may be the corner edge model KCE-107-12PAT2 from Kyocera or the near edge model SH2004-DC70A from Rohm. The array of selectively activatable heating elements sweeps over the deposited layer in use, the area swept out being an active region in which heat treatment can take place. Each point on the deposited layer in the active region may be uniquely addressed by the coordinate (n,t), where n is an identifier for a heating element and t is a time during the sweeping operation. The selectable area of green material may be represented using such coordinates, e.g. transformed from cross-sectional data extracted from virtual design data, which may be represented by an STL, IGES, STEP file or the like converted from a CAD model. The methods and software for identifying the successive cross-sectional areas and providing appropriate instructions to the individual heating elements correspond to equivalent methods known in conventional three-dimensional printing and direct thermal printing respectively and are therefore not discussed in detail herein.

To protect the thermal print heads 114 from direct contact with the build material, a protective sheet 116 is disposed in between. In this embodiment, the protective sheet is a heat conductive sheet of glass fibre enhanced PTFE having a thickness of about 0.08 mm. The protective sheet 116 may be fixed relative to the print mechanism during a printing pass (i.e. as the print mechanism moves over the material bed in the print direction or reverse print direction). However, the protective sheet 116 may be adjustable (manually or automatically) to feed itself across the material bed (e.g. between printing passes) so that it renews over time.

The protective sheet 116 is in contact with the uppermost layer of the material bed in all but two locations, where it is separated from the uppermost layer and drawn upwards before being brought back into contact. In a first separation location, which is before the thermal print heads 114 in the print direction 108, the protective sheet 116 is separated from the material bed to create a distribution gap 118 in which a recoater 120 is arranged to spread a layer of green material over the material bed. In this embodiment, the green material may be a fine grained (e.g. having an average particle size of 50-150 μm) polyamide powder, but may be ultra-high molecular weight polyethylene (UHMWPE) or high density polyethylene (HDPE), or any other suitable material, e.g. acrylonitrile butadiene styrene (ABS). The recoater 120 is a inverse U-shaped channel, which may receive a heap of powder from a suitable powder feed mechanism (not shown).

The protective sheet 116 is drawn away from the distribution gap 118 by a first roller guide 122. The point of separation occurs at the back (trailing) edge 126 of a separator 124. The protective sheet 116 is guided back into contact with the newly deposited layer via a second roller guide 128 and the leading edge 130 of a compressor 132. The compressor 132 is arranged to compact the deposited powder in preparation for heat treatment. The compressor 132 includes a heating element (not shown) for pre-heating the newly deposited layer before it reaches the thermal print heads 114.

The second separation point occurs after heat treatment of the deposited layer. Here the protective sheet 116 is drawn away from the material bed by a third roller guide 134. The point of separation occurs at the back (trailing) edge 136 of a post-print separator 138. The protective sheet 116 is then guided back into contact with the deposited layer via a fourth roller guide 140 and the leading edge 142 of a reverse separator 144, which is discussed in more detail below.

On each side of the print mechanism 100 there is a temperature regulating element 146, 148. In this embodiment, the temperature regulating elements 146, 148 are heated plates which are dimensioned to lie over and completely cover the top surface of the material bed. The purpose of the temperature regulating elements 146, 148 is to maintain the temperature of the heat-treated material in the material bed above a predetermined target temperature to both prevent warping due to thermal shrinkage and to strengthen the binding between heat-treated regions by lengthening the time in which molten particles are able to flow together. The temperature of the temperature regulating elements 146, 148 is therefore preferably controlled to be above the crystallization temperature of the polymer in the build material.

However, a potential disadvantage of maintaining the temperature of the build material at this level is that the separation from the protective sheet is made more difficult, e.g. because the build material (especially the heat-treated material) may adhere to the protective sheet and be drawn out of position as the protective sheet is brought away from the uppermost layer.

To ameliorate or prevent the disadvantage mentioned above, the separator 124 and post-print separator 138 are cooled in order to extract heat from the uppermost layer of the material bed just before the point of separation. Extract heat in this way can facilitate separation, e.g. by cooling the heat-treated material enough to cause a temporary firm crust to form, which is conducive to separation from the protective sheet without any disturbance in its position.

In this embodiment, the separator 124 and post-print separator 138 are formed from thermally conductive material in thermal communication with a coolant distribution circuit, e.g. a pipe 150 carrying cooling water.

The coolant may be distributed in a manner that causes a cooling surface 152 of the separator 124, e.g. a base surface in contact with the uppermost surface of the material bed via the protective sheet, to have a temperature much lower than the temperature of the temperature regulating elements 146, 148, e.g. a temperature less than the crystallization temperature, e.g. in the range 45° C. to 50° C.

The post-print separator 138 may be cooled in a similar manner.

The print mechanism shown in FIG. 1 is reversible, i.e. capable of bi-directional printing in print direction 108 and reverse print direction 110. The print mechanism is adjustable between a first configuration for printing in the print direction 108 and a second configuration for printing the reverse print direction. FIG. 1 shows the first configuration. In the second configuration, the recoater 120 is interchanged with a reverse post-print separator 154, and the post-print separator 138 is interchanged with a reverse recoater 156. A reverse compressor 157 is mounted before the thermal print heads in the reverse print direction 110. The interchanging operation may be performed automatically using a reciprocating mechanism, which can move the respective recoater and post-print separator pairs as shown by arrows 158. The interchange operation causes a distribution gap to be closed on one side of the thermal print heads 114 and opened on the opposite side.

Thus, in a reverse print operation, the reverse separator 144 provide the first point of separation of the protective sheet 116 from the uppermost layer of the material bed. The reverse separator may thus be cooled in the same way as the separator 124.

Figure 2:
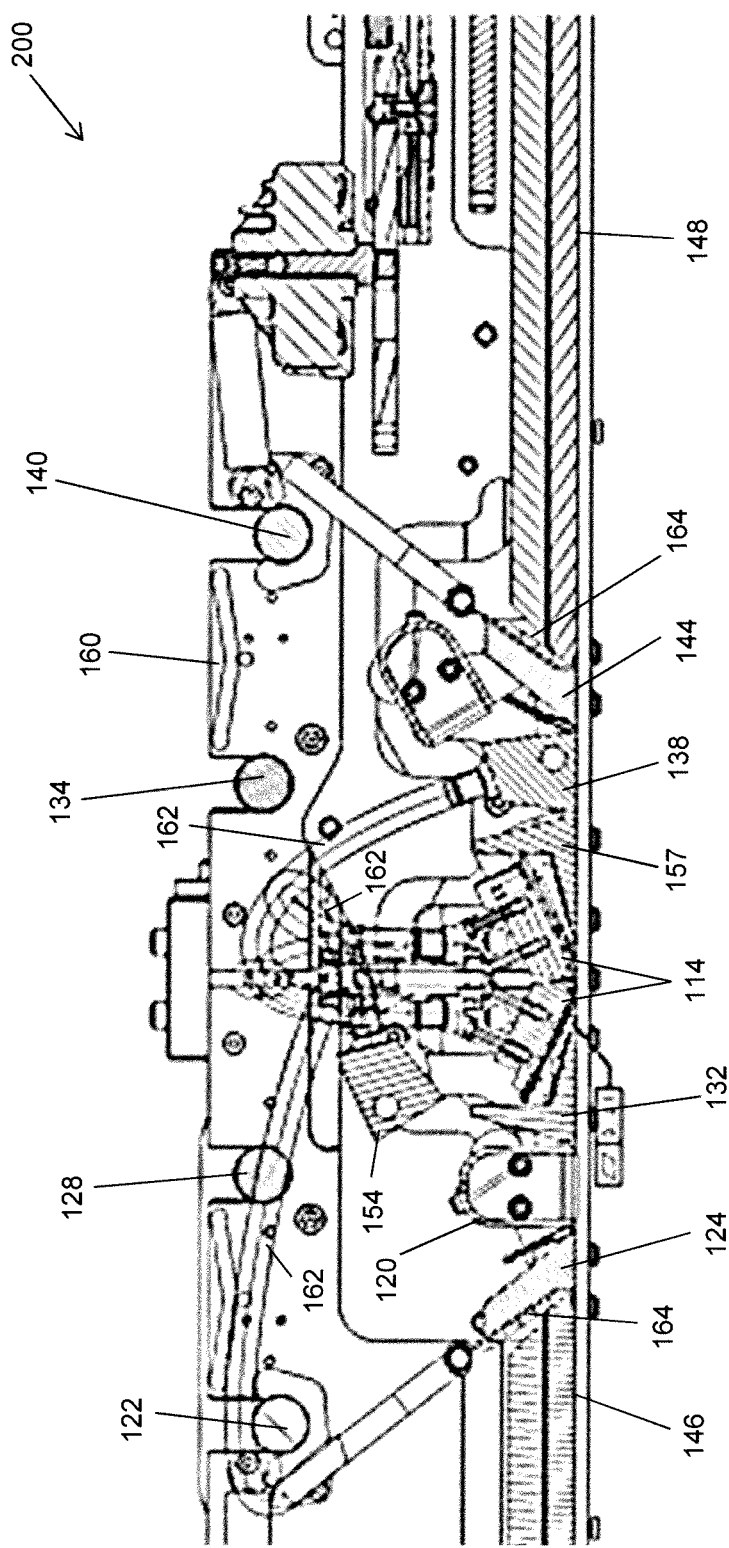
FIG. 2 shows a cross-sectional view through a print mechanism for a three-dimensional printer that is another embodiment of the invention.

FIG. 2 shows a cross-sectional view through a print mechanism 200 for another embodiment of the invention. Similar features are given the same reference number as FIG. 1 and description thereof is not repeated. For clarity, the protective sheet is omitted in this view. This view shows a frame 160 on which the features described above are mounted. The frame 160 is movable relative to the material bed. Moreover, this view shows coolant distribution conduits 162 for supplying coolant for the separator 124, reverse separator 144 and post-print separators 138, 154. The separator 124 and reverse separator 144 are in thermal communication with the coolant via a respective heat exchange plate 164 mounted thereon. In this embodiment, the thermal print heads 114 are also cooled.

The invention claimed is:

1. A three-dimensional printer for building a three-dimensional object by sequential deposition and heat treatment of a plurality of cross-sectional layers, the printer comprising:
    a material bed for supporting the plurality of cross-sectional layers;
    a print mechanism movably mounted in a print direction over the material bed, the print mechanism comprising:
        a temperature regulating element in thermal communication with the material bed to control the temperature of an uppermost layer of deposited material;
        a recoater for spreading a layer of flowable green material on the material bed, the recoater being located after the temperature regulating element in the print direction; and
        a print head arranged to transfer thermal energy by conduction to the layer of flowable green material on the material bed, the print head being located after the recoater in the print direction;
    a protective sheet located over the material bed in between the uppermost layer of material on the material bed and the temperature regulating element and in between the layer of flowable green material and the print head,
        wherein the print mechanism includes a separator located before the recoater in the print direction, the separator being arranged to separate the protective sheet from the uppermost layer of deposited material to provide access for the recoater to spread the layer of flowable green material on to the uppermost layer of material on the material bed,
        wherein the separator has a cooling surface in thermal communication with the uppermost layer of deposited material; and
    a cooling mechanism to maintain the cooling surface being at a lower temperature than the temperature of the temperature regulating element.

2. A three-dimensional printer according to claim 1, wherein the cooling mechanism comprises one or more of a heat sink, a coolant distribution circuit, and a thermoelectric cooling element in thermal communication with the cooling surface.

3. A three-dimensional printer for building a three-dimensional object by sequential deposition and heat treatment of a plurality of cross-sectional layers, the printer comprising:
    a material bed for supporting the plurality of cross-sectional layers;
    a print mechanism movably mounted in a print direction over the material bed, the print mechanism comprising:
        a temperature regulating element in thermal communication with the material bed to control the temperature of an uppermost layer of deposited material;
        a recoater for spreading a layer of flowable green material on the material bed, the recoater being located after the temperature regulating element in the print direction; and
        a print head arranged to transfer thermal energy by conduction to the layer of flowable green material on the material bed, the print head being located after the recoater in the print direction;
    a protective sheet located over the material bed in between the uppermost layer of material on the material bed and the temperature regulating element and in between the layer of flowable green material and the print head,
        wherein the print mechanism includes a separator located before the recoater in the print direction, the separator being arranged to separate the protective sheet from the uppermost layer of deposited material to provide access for the recoater to spread the layer of flowable green material on to the uppermost layer of material on the material bed, wherein the separator has a cooling surface in thermal communication with the uppermost layer of deposited material, the cooling surface being at a lower temperature than the temperature of the temperature regulating element; and a coolant distribution circuit arranged to deliver a supply of coolant into the separator.

4. A three-dimensional printer according to claim 1, wherein the flowable green material consists of a powdered polymer material having a crystallization temperature and a melting point, and wherein the temperature regulating element has a temperature above the crystallization temperature and below the melting point.

5. A three-dimensional printer according to claim 2, wherein the cooling mechanism is configured to maintain the temperature of the cooling surface at a temperature sufficient to cool the uppermost surface of deposited material by 5° C. or more.

6. A three-dimensional printer according to claim 5, wherein the cooling mechanism is configured to maintain the temperature of the cooling surface in the range 45° C. to 50° C.

7. A three-dimensional printer according to claim 1, wherein the print mechanism includes a compressor for compacting the layer of flowable green material, the compressor being located before the print head in the print direction.

8. A three-dimensional printer according to claim 7, wherein the compressor is arranged to receive the protective sheet and guide it into contact with the layer of flowable green material.

9. A three-dimensional printer according to claim 7, wherein the compressor includes a heating element arranged to heat the layer of flowable green material as it is compacted.

10. A three-dimensional printer according to claim 9, wherein the temperature of the compressor is greater than the temperature of the temperature regulating element.

11. A three-dimensional printer according to claim 1, wherein the print mechanism includes a post-print temperature regulating element located after the print head in the print direction, the post-print temperature regulating element being located on the protective sheet and in thermal communication with the material bed to control the temperature of an uppermost layer of deposited material after heat treatment of a selectable region thereof.

12. A three-dimensional printer according to claim 11, wherein the post-print temperature regulating element is at the same temperature as the temperature regulating element located before the recoater in the print direction.

13. A three-dimensional printer according to claim 1, wherein the print mechanism includes a post-print separator located after the print head and before the post-print temperature regulating element in the print direction, the post-print separator being arranged to separate the protective cover from the uppermost layer of deposited material, wherein the post-print separator has a cooling surface in thermal communication with the uppermost layer of deposited material, the cooling surface being at a lower temperature than the temperature of the post-print temperature regulating element.

14. A three-dimensional printer according to claim 13, wherein the cooling surface of the post-print separator is at a lower temperature than the cooling surface of the separator.

15. A three-dimensional printer according to claim 13 wherein:

the recoater is interchangeable with a reverse post-print separator;

the post-print separator is interchangeable with a reverse recoater; and the print mechanism includes a reverse separator located before the post-print temperature regulating element in the print direction, whereby the print mechanism is operable to print in a reverse direction opposite to the print direction.

16. A three-dimensional printer according to claim 15, wherein the separator and reverse separator are connected to a common coolant distribution circuit.

17. A three-dimensional printer according to claim 16, wherein the post-print separator and reverse post-print separator are connected to the common coolant distribution circuit.

18. A three-dimensional printer, comprising:

a material bed to support a flowable green material;

a print head arranged to transfer thermal energy by conduction to green material on the material bed;

a protective sheet to protect the print head from direct contact with green material on the material bed;

a separator arranged to separate the protective sheet from green material on the material bed, the separator having a cooling surface to cool green material on the material bed; and a cooling mechanism to actively cool the separator cooling surface.

19. A three-dimensional printer according to claim 18, wherein the cooling mechanism comprises a coolant distribution circuit in thermal communication with the separator cooling surface.

20. A three-dimensional printer according to claim 18, wherein the cooling mechanism comprises a thermoelectric cooling element in thermal communication with the separator cooling surface.

* * * * *

UNITED STATES PATENT AND TRADEMARK OFFICE
CERTIFICATE OF CORRECTION

PATENT NO. : 10,052,825 B2
APPLICATION NO. : 14/890861
DATED : August 21, 2018
INVENTOR(S) : Frederik Walsted Tjellesen et al.

It is certified that error appears in the above-identified patent and that said Letters Patent is hereby corrected as shown below:

In the Claims

In Column 10, Line 35, Claim 1, before "at a" delete "being".

In Column 12, Line 1, Claim 13, delete "claim 1," and insert -- claim 11, --, therefor.

Signed and Sealed this
Twenty-fifth Day of June, 2019

Andrei Iancu
*Director of the United States Patent and Trademark Office*